US007366940B2

(12) United States Patent
Chiao et al.

(10) Patent No.: US 7,366,940 B2
(45) Date of Patent: Apr. 29, 2008

(54) MULTIPROTOCOL COMPUTER BUS INTERFACE ADAPTER AND METHOD

(75) Inventors: Jennifer Y. Chiao, Irvine, CA (US); Gary A. Alvstad, Irvine, CA (US); Myles H. Wakayama, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 184 days.

(21) Appl. No.: 10/990,657

(22) Filed: Nov. 17, 2004

(65) Prior Publication Data
US 2005/0066212 A1 Mar. 24, 2005

Related U.S. Application Data

(63) Continuation of application No. 09/865,844, filed on May 25, 2001, now Pat. No. 6,829,715.

(60) Provisional application No. 60/208,453, filed on May 31, 2000.

(51) Int. Cl.
*G06F 1/04* (2006.01)
(52) U.S. Cl. .................... 713/401; 713/503
(58) Field of Classification Search ........ 713/400, 713/401, 503
See application file for complete search history.

(56) References Cited

U.S. PATENT DOCUMENTS 5,652,530 A 7/1997 Ashuri
(Continued)

FOREIGN PATENT DOCUMENTS

EP 0 353 027 1/1990
JP 2000-99192 4/2000

OTHER PUBLICATIONS

Yongsam Moon, et al., "An All-Analog Multiphase Delay-Locked Loop Using a Replica Delay Line for Wide-Range Operation and Low-Jitter Performance," *IEEE Journal of Solid-State Circuits*, Mar. 2000, pp. 377-384, vol. 35, No. 3.

(Continued)

*Primary Examiner*—Dennis M. Butler
(74) *Attorney, Agent, or Firm*—Sterne Kessler Goldstein & Fox, P.L.L.C.

(57) ABSTRACT

A predictive time base generator having predictive synchronizer and replica delay element coupled with the synchronizer feedback delay loop. The predictive time base generator receives a clock signal delayed by a predetermined clock delay and produces a predictive time signal advanced in time by an amount represented by the replica delay element. The replica delay element can replicate one or both of a predetermined clock delay and a predetermined data delay, substantially nullifying the respective delays in critical signal paths of a device. The replica delay element can include replicas of structure(s) found in an incoming clock path and an outgoing data path, such elements including, for example, voltage level shifters, buffers or data latches, multiplexers, wire element models, and the like. A predictive computer bus interface adapter which incorporates the aforementioned predictive time base generator also is provided. Such a predictive interface adapter can be adapted to be observant of stringent bus protocol timing budgets imposed under the PCI and PCI-X local bus protocol, and to be robust relative to variations in design and fabrication processes, and environmental operating conditions.

22 Claims, 7 Drawing Sheets

U.S. PATENT DOCUMENTS

| | | |
|---|---|---|
| 6,047,383 A | 4/2000 | Self et al. |
| 6,081,146 A * | 6/2000 | Shiochi et al. ............... 327/277 |
| 6,215,726 B1 | 4/2001 | Kubo |
| 6,553,505 B1 | 4/2003 | Brown et al. |
| 6,636,980 B1 | 10/2003 | Gervais et al. |

OTHER PUBLICATIONS

Yongsam, Moon, et al., "A 62.5-250 MHz Multi-Phase Delay-Locked Loop using a Replica Delay Line with Triply Controlled Delay Cells," *IEEE 1998 Custom Integrated Circuits Conference*, May 1999, pp. 299-302, IEEE, Piscataway, New Jersey.

\* cited by examiner

MULTIPROTOCOL COMPUTER BUS INTERFACE ADAPTER AND METHOD

CROSS-REFERENCE TO RELATED APPLICATION(S)

The present application is a continuation of U.S. patent application Ser. No. 09/865,844, filed May 25, 2001, now U.S. Pat. No. 6,829,715 and entitled "MULTIPROTOCOL COMPUTER BUS INTERFACE ADAPTER AND METHOD" which claims priority on the basis of the following U.S. Provisional Patent Application Ser. No. 60/208,453, filed May 31, 2000, and entitled "PCIX/PCI BUS IMPLEMENTATION," the entire contents of both of which are hereby incorporated by reference.

BACKGROUND OF THE INVENTION

1. Field of the Invention

The present invention relates to computer bus interfaces, particularly to high-performance, high-bandwidth computer bus interfaces, and more particularly to a computer bus interface adapter with a predictive time base generator therein.

2. Background of the Invention

Computer processors typically communicate with cooperating components along one or more computer buses. Peripheral components, including audio, and print devices, portable storage media, and low-bandwidth networking devices usually are coupled with the bus through a peripheral or expansion computer bus interface adapter. On the other hand, devices with high bandwidth needs, including video, memory, high-performance networking, and core storage media often are linked to the CPU via a high-bandwidth local bus interface adapter. Components on expansion buses typically have operational speeds many orders of magnitude slower than that of the CPU; however, such components sporadically access CPU and system resources and, thus, critical design issues such as bus latency, setup & hold times, and clock-to-data time are of little import to interface adapters designed for those applications.

Although high-bandwidth, high-performance, local bus components and adapters tend to operate at clock speeds much higher than their expansion bus counterparts, they still lag current CPU speeds by about an order of magnitude. However, because local bus components tend to interact with the CPU to a significant degree, slow, inefficient, and poorly-designed local bus interface adapters can potentially waste substantial amounts of processor and system resources. Therefore, local bus interface adapters-are usually faced with observing strict timing budgets when accessing and providing data to the local bus.

Many factors can lead an adapter to violate the timing budget imposed by a bus protocol. For example, delays introduced in the clock trees and in the data paths of bus adapters, or both, can effectively decouple the interface adapter from the bus, because the adapter response time fails to remain synchronized to the bus clock. The functional characteristics of VLSI devices employed in such high-bandwidth, high-performance computer bus interface adapters can be susceptible to design and process variations during manufacturing. Also, the response of such adapters can be compromised by variations in environmental conditions while operating.

There is a need, then, for a local bus interface adapter that mitigates critical path delays within a computer bus interface adapter, or device, to the extent that they do not violate the aforementioned timing budgets. It is desirable that such an adapter is robust to design and process variations during manufacturing, as well as to the environmental conditions, which may be encountered during operations. Because multiple local bus protocols exist in common computer environments, there also is a need for a robust, multiprotocol computer bus interface adapter that is observant of stringent bus protocol timing budgets.

SUMMARY OF THE INVENTION

The present invention satisfies the above needs by providing a predictive time base generator having predictive synchronizer and a replica delay element coupled with a feedback delay loop of the synchronizer. The predictive time base generator receives a clock signal delayed by a predetermined clock delay and produces a predictive time signal advanced in time by an amount represented by the replica delay element. Because it is desired that the replica delay element replicate one or both of the predetermined clock delay and the predetermined data delay, the predictive time base generator can substantially nullify the respective predetermined clock delay and the predetermined data delay. The replica delay element can include replicas of structure(s) found in an incoming clock path and an outgoing data path, such elements including, for example, voltage level shifters, buffers or data latches, multiplexers, wire element models, and the like, such that the time delay through the replica delay element can be adapted to match an undesirable time delay in a critical signal path of the device. The present invention also satisfies the above needs by providing a predictive computer bus interface adapter, which incorporates the aforementioned predictive time base generator. Such a predictive interface adapter can be adapted to be observant of stringent bus protocol timing budgets imposed under the PCI-X local bus protocol, and to be robust relative to variations in design and fabrication processes, and environmental operating conditions. In one embodiment of the present invention, the predictive interface adapter can be realized in a single-chip VLSI implementation, for example, an 0.18 micron CMOS VLSI implementation. Furthermore, it is preferred that the predictive interface adapter be a multiprotocol predictive interface adapter that can accommodate multiple computer bus protocols, including the PCI local bus protocol and the PCI-X local bus protocol, as well as similar bus protocols such as, for example, the CardBus protocol.

BRIEF DESCRIPTION OF THE DRAWINGS

These and other features, aspects and advantages of the present invention will be more fully understood when considered with respect to the following detailed description, appended claims and accompanying drawings, wherein:

DESCRIPTION OF THE EMBODIMENTS

To meet stringent timing requirements, whether in a computer bus interface adapter, or in another high-performance digital environment, the present invention provides a predictive time base generator that produces a predictive clock signal, typically advanced in time relative to an input clock signal, which can compensate for elements producing delays in a data path, a clock path, or both. It will be apparent to the skilled practitioner that the predictive time base generator of the present invention can be employed to compensate for critical path delays in applications other than computer bus interface adapters as well, and it is intended that the scope of the present invention include such applications. For example, within the domain of IEEE Std. 802.3-related network adapters, the predictive time base generator of the present invention can be employed advantageously in a myriad of interfaces including, without limitation, XGMII (10-Gigabit Media Independent Interface), XAUI (10-Gigabit attachment unit interface), XSBI (10-Gigabit serial bus interface), SGMII (Serial Gigabit Media Independent Interface), RGMII (Reduced Gigabit Media Independent Interface), RTBI (Reduced Ten Bit Interface), GMII (Gigabit Media Independent Interface), as well as in TBI, SMII, and MII interfaces. IEEE Std. 802.3, 2000 Edition, relevant to such implementations, is hereby incorporated herein in its entirety.

Figure 1:
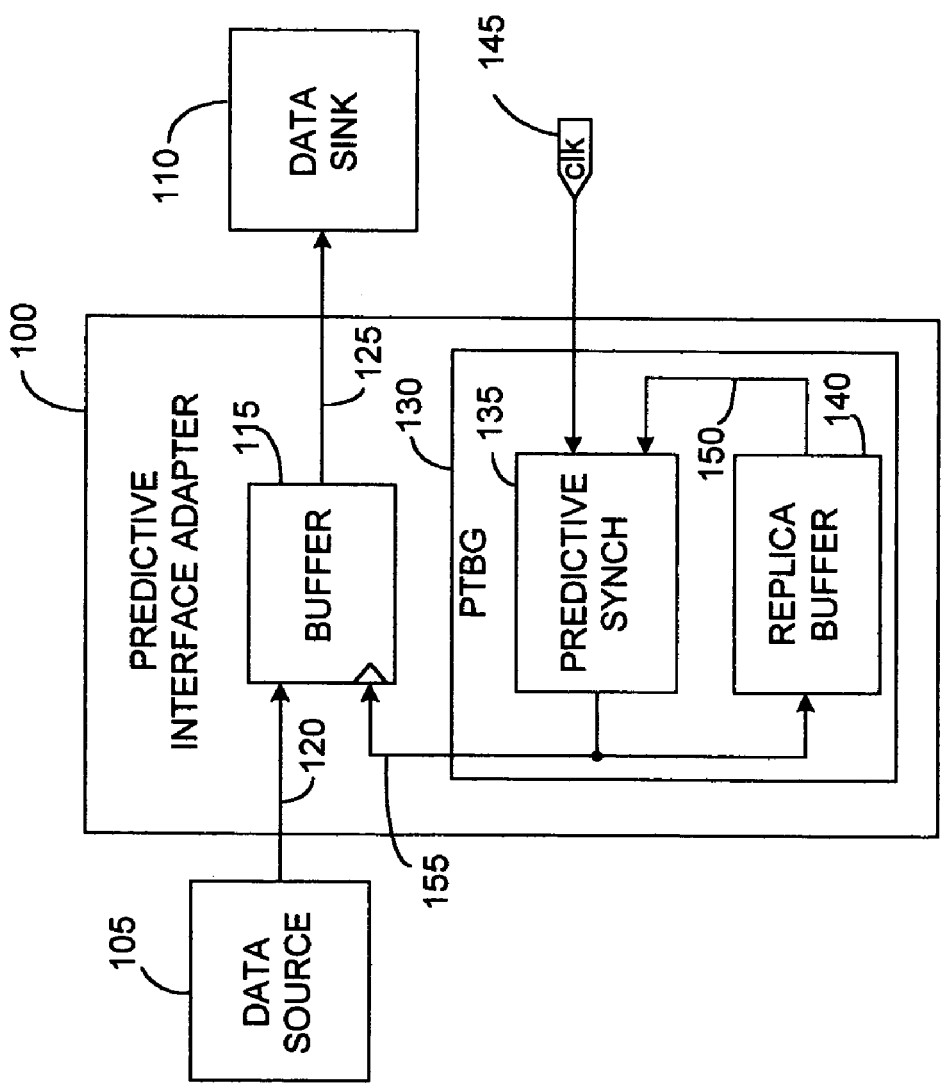
FIG. 1 is a block schematic of an embodiment of a predictive time base generator according to the present invention, in the context of a predictive interface adapter for a computer bus.

FIG. 1 illustrates one embodiment of the invention herein, in which predictive interface adapter (PIA) 100 is interposed in data path 120, 125 between data source 105, and data sink 110, of communication system 101. PIA 100 can include a data delay element, here buffer 115, and predictive time base generator (PTBG) 130. For purposes of illustration, the relevant preselected edge of clock signal 145 will be defined as the arriving rising edge. Assuming valid data is available on data output path 120, prior to the arriving edge of clock signal 145, direct clocking of buffer 115 by input clock signal 145 would impose a delay upon data propagating through buffer 115 from data path 120 to data path 125. In this case, the period between the arriving rising edge of clock signal 145 to valid data out on path 125 would be extended by the predetermined data delay through delay element 115. On the other hand, by providing an early clock signal, relative to the rising edge of clock signal 145, buffer 115 can be clocked after data is valid on data path 120 but before the actual arrival of the rising edge of clock signal 145, substantially nullifying the predetermined data delay, and minimizing the period between the rising edge of clock signal 145 to valid data out on data path 125.

In order to provide such an early clock signal, PTBG 130 provides a predictive clock signal 155 to buffer 115. PTBG 130, according to the present invention, can include a predictive synchronizer 135, which receives input clock signal 145 and, through, delay feedback 150, produces signal 155 substantially locked with, but advanced relative to, clock input signal 145. In general, it is preferred that synchronizer 135 be a phase lock loop (PLL), although a delay lock loop (DLL) also may be used. By inserting replica delay element 140 between synchronizer output 155 and delay feedback 150, synchronizer 135 can lock with input clock signal 145 such that predictive signal 155 is advanced, relative to signal 145, by an amount of time substantially replicating the predetermined data delay imposed by delay element 115. Thus, valid data can be made available on path 125 essentially simultaneously with the arriving rising edge of clock signal 145, and PTBG 130 assists with data synchronization as well as providing a predictive timing signal. It is generally preferred to replicate the structure(s) inducing the critical data path delay within replica delay element 140, in order to obtain an accurate and robust approximation of the predetermined data delay. Advantageously, the approximation of the predetermined data delay thus obtained is largely unaffected by variations in design and fabrication processes, operating environment, and the like.

Figure 2:
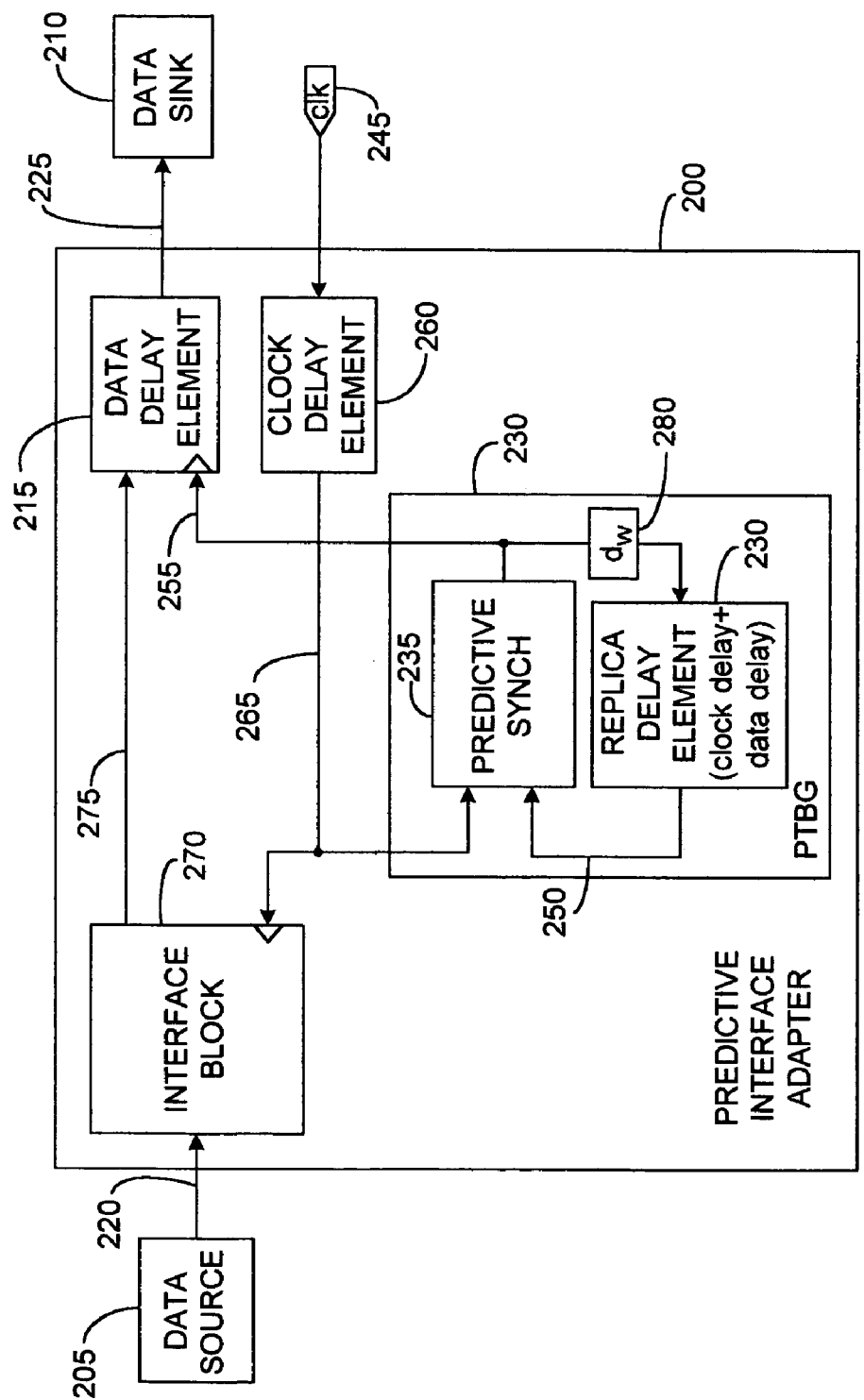
FIG. 2 is a block schematic of an another embodiment of a predictive time base generator according to the present invention.

In many applications, a data path delay can be accompanied by a clock-related delay, for example, a clock tree delay. Thus, PIA 200 in FIG. 2 is adapted to additionally compensate for clock-related delays in internal clock path producing delayed clock signal 265. Similar to the structure and function described with regard to FIG. 1, PIA 200 is interposed between data source 205 and data sink 210, in communication system 201. PIA 200 includes PTBG 230, which provides predictive clock signal 255 to data delay element 215. As before, a predetermined data delay exists within PIA 200, as indicated by data delay element 215.

However, in PIA 200, an additional source of delay is encountered, namely, a predetermined clock delay in the propagation of input clock signal 245, which clock delay is modeled by clock delay element 260. In order to compensate for both types of delays, it is desirable to adapt replica delay element 230, which is coupled with delay feedback 250, to replicate therein both data delay element 215 and clock delay element 260. In this manner, predictive synchronizer 235 produces predictive clock signal 255 advanced in time, relative to input clock signal 245, to substantially nullify both the predetermined data delay and the predetermined clock delay.

In operation, interface block 270 receives data on data path 220 from data source 205. This data is made available on data path 275 to data delay element 215 before the arrival of the preselected (e.g., rising) edge of input clock signal 245. Were data delay element 215 to be clocked by delayed clock signal 265, the resultant delay from clock 245 to valid data out on data path 225 would be approximately the sum of the predetermined data delay and the predetermined clock delay. Because the clock-to-valid-output-data delay is typically one of the most difficult timing constraints to meet in such a device, direct clocking by delayed clock signal 265 may cause a standard interface adapter to violate, or undesirably approach, the relevant timing restriction. Thus, it is preferred that predictive clock signal 255 clocks data delay element 215 in advance of the arrival of input clock signal 245 such that valid data is available on data path 225 at, or desirably near, the arrival of the rising edge of input clock signal 245 to PIA 200.

In the event that wire delays represent significant components in the data delay, the clock delay, or both, a compensatory replica wire delay element 280, corresponding to the undesirable wire delays, can be incorporated with delay element 230 in the path of feedback delay 250.

Moreover, interface block 270 can be a component that selectively transfers data in a manner suitable to one or more computer bus protocols, and thus PIA 200 can be a multi-protocol predictive interface adapter.

The embodiments of the present invention illustrated in FIG. 1 and FIG. 2 can be used in a variety of devices in which it is desired to reduce the effects of signal propagation delay, for example, in a computer network or in a computer system. Such computer network components, for example, network time synchronizers and Serializer-Deserializers (SERDES), can be adapted for applications related to exemplary networking protocols including, without limitation, Ethernet, SONET/SDH, Fibre Channel, Ultra3 SCSI, Infini-Band, and the like.

Certain preferred embodiments of the invention herein can be especially advantageous when used in conjunction with particular computer bus interface adapters, particularly where multiple bus protocols are employed. Such an application can based, for example, on the Peripheral Component Interconnect (PCI) Local Bus specification and its subsequent enhancements. A skilled artisan would realize, however, that the present invention also can readily be adapted for bus implementations similar to the PCI Local Bus, including, without limitation, CardBus implementations. CardBus is a 32-bit bus mastering interface defined by the PC Card Standard, Release 8, March 1997, and by the PCI to PCMCIA CardBus Bridge Register Description (Yenta specification—Intel Corporation) which standards are incorporated herein in their entirety.

It will be useful to briefly describe the PCI bus family of protocols in order to inform the subsequent descriptions of additional embodiments of the invention, as realized in the context of the PCI/PCI-X bus protocols. The PCI specification was introduced to define a low-latency path between the microprocessor local bus and faster peripherals, such as high-resolution video boards, disk controllers, and LAN devices. The original PCI bus specification (PCI33) defines a 33 MHZ, 32- or 64-bit data path to achieve a bandwidth of about 133 Mbps. Later, the 66 MHZ PCI (PCI66) bus was introduced as a compatible superset of PCI33. A PCI66 bus operates up to a maximum clock speed of 66 MHZ, also using a 32- or 64-bit data path, providing a peak bandwidth of about 533 megabytes per second (MB/s). Differences between the PCI33 bus and the PCI66 bus are minimal: PCI66 utilizes the PCI33 bus protocol, signal definitions, and connector layout, and simply operates at a higher maximum bus clock frequency. The PCI66 bus is specified to be interoperable with the PCI33 bus; a PCI66 device operates as a PCI33 device when it is connected to a 33 MHZ PCI bus. Similarly, if any PCI33 devices are connected to a PCI66 bus, the PCI66 bus operates as if it were a PCI33 bus. PCI33 devices are specified to operate between 0-33 MHZ and PCI66 devices between 33-66 MHZ.

However, despite the advantages of the PCI66 protocol, business-critical applications continue to demand greater bandwidth, and shorter response times, from the input/output (I/O) subsystems of enterprise computers. Faster and more complex I/O devices such as Gigabit Ethernet, Fibre Channel, Ultra3 SCSI, and multi-port network interface controllers (NICs) can demand far greater bandwidth than PCI33, or PCI66, can provide. For example, a four-port Gigabit Ethernet NIC, with each port capable of 1 gigabit-per-second, or 125 MB/s, of sustained throughput would overwhelm the 64-bit, 66-MHZ PCI bus bandwidth by consuming essentially all available bandwidth. Thus, the conventional PCI bus technology can become a performance bottleneck. To break this I/O bottleneck, the PCI-X bus was developed as an enhancement of the industry-standard PCI bus.

Both PCI33 and PCI66 bus specifications (hereinafter, "conventional PCI") are described in detail in the PCI Local Bus Specification, Revision 2.2; the PCI-to-PCI Bridge Architecture Specification, Revision 1.1; the PCI Power Management Interface Specification, Revision 1.1; the PCI BIOS Specification, Revision 2.1, the PCI Hot Plug Specification, Revision 1.0; the Mini PCI Specification, Revision 1.0; and the Small PCI Specification, Revision 1.5aS; as amended, (collectively, "PCI Specification"). In addition, the PCI-X66 and PCI-X133 bus specifications are described in detail in the PCIX Addendum To The PCI Local Bus Specification, Revision 1.0a, as amended ("PCI-X Specification"), in addition to pertinent parts of the PCI Specification. The foregoing specifications are incorporated by reference in their respective entireties herein.

PCI-X technology can increase bus capacity to more than eight times the conventional PCI bus bandwidth—from 133 MB/s with the 32-bit, 33 MHZ PCI bus, to 1066 MB/s with the 64-bit, 133 MHZ PCI-X bus. PCI-X enables the design of systems and devices that can operate at bus frequencies of up to 133 MHZ using a 64-bit bus width, a significant improvement in performance beyond that of conventional PCI systems. The PCI-X specification defines two frequency design points, and two data path widths, for PCI-X adapters: PCI-X 66 MHZ and PCI-X 133 MHZ, each capable of having 32- or 64-bit data paths. When operating in PCI-X mode, PCI-X66 adapters can have actual clock frequencies ranging from 50 to 66 MHZ, and PCI-X133 adapters can have clock frequencies ranging from 50 to 133 MHZ.

In general, PCI-X provides backward compatibility with conventional PCI bus designs at both the adapter and system level. Devices can be designed to meet PCI-X66 and PCI-X133 requirements, yet operate as conventional PCI33 and PCI66 devices when installed in those systems. Conversely, if conventional PCI devices are installed on a PCI-X bus, the bus clock remains at a frequency acceptable to the conventional adapter, and other adapters on that bus segment are restricted to using the conventional PCI protocol. If only PCI-X devices are installed on a PCI-X bus, that bus segment can operate using the PCI-X protocol. However, despite backward compatibility, there are fundamental differences between the PCI and PCI-X protocols that pose challenges to the design of PCI-X133 adapters which yield maximum bandwidth in a PCI-X133 environment, yet are fully functional as PCI33 devices in a 33 MHZ signaling environment. A key difference relates to the disparate natures of PCI and PCI-X bus transactions, which are described presently.

In PCI terminology, a requester is a requesting device and a target is the device that responds to that request. The fundamental unit of information transfer is a transaction, which is a combination of address, data, and bus turn-around phases occurring between requester and target. A sequence is one or more transactions associated with carrying out a single logical transfer by a requester. A delayed transaction is a transaction in which one or more wait states are inserted by requester or target devices. The PCI-X protocol does not implement delayed transactions.

Typically, each conventional PCI transaction takes three overhead cycles, and a variable number of data cycles, to complete, including a bus turn-around cycle. The conventional PCI protocol implements an immediate protocol, in which, during the first clock cycle of the PCI transaction, the requester propagates across the bus an address signal that all potential targets must immediately decode in order to decide which target is to respond, with the actual target device responding to the requester by the next clock cycle. During subsequent cycles, the data phase is executed, with the requester constantly polling the target to determine whether the data phase has completed. If it has not, then the requester or target inserts one or more wait states into the transaction to "stall" the bus until the transaction is completed, which can slow bus throughput dramatically. Finally, the bus turn-around phase is executed and the PCI bus is released for another transaction.

Of the 30-ns PCI33 clock cycle time, 7-ns are allocated during the first clock cycle for target device logic decoding, which usually is sufficient to permit a response by the next rising clock edge. However, for PCI66 designs, having a clock cycle time of 15 ns, target device logic decoding is reduced to 3 ns, making a device or adapter using the conventional PCI66 protocol difficult to implement.

The performance improvements realized by the PCI-X protocol are a result of two primary differences between conventional PCI and PCI-X: higher clock frequencies made possible by the register-to-register protocol, and new protocol enhancements such as the attribute phase and split transactions. Under the registered PCI-X protocol, the target receives in a register the signal sent by the requester during the first clock cycle. Unlike with an immediate protocol, the target is not required to respond to the requester until the rising edge of a subsequent clock cycle, thus allowing the target an entire clock cycle to decode the requester signal, and up to two clock cycles to respond.

Although the PCI-X registered protocol reduces certain timing constraints, PCI-X transactions nominally take four overhead cycles to complete the address, attribute, target response, and bus turn-around phases. The attribute phase optimizes system performance by including such properties as the byte count, bus number, and device number as part of the transaction; assists components optimize their performance during data transfers; and facilitates interfacing the PCI-X bus to packet-based systems, because the length of a transaction is communicated at the beginning of the transaction.

When a PCI-X device does not have data to transfer, it removes itself from the bus, so that another device can use the bus bandwidth. A split transaction is a sequence in which an initial transaction is sent defining action to be taken by the target, after which the bus is released until the target is ready to execute the transactions necessary to complete the sequence. By implementing split transactions, the PCI-X protocol advantageously eliminates the use of wait states, except for initial target latency, resulting in a more efficient use of bus and memory resources. Despite the clock cycle added to the basic PCI-X transaction, the actual time required to complete the transaction can be greatly reduced. For example, a transaction that takes nine cycles at 33 MHZ will finish in about 270 ns, while a PCI-X transaction that takes ten cycles at 133 MHZ will finish in about 75 ns, yielding a significant reduction in transaction time.

Due to the constraints imposed by the PCI immediate protocol, many designs for 66 MHZ devices are preferred to be implemented using PCI-X66 protocol over the PCI66 protocol. However, despite the advantages of using the PCI-X protocol, pragmatic operational considerations make designing PCI-X133 devices quite difficult because stringent internal timing budgets must be strictly observed in order to operate at maximum throughput.

The relevant timing budget can be expressed by the equation:

$$T_{cyc} \geq T_{val} + T_{prop} + T_{su} + T_{skew}$$

where $T_{cyc}$ is the clock cycle time; $T_{val}$ is the clock(clk)-to-output-signal-valid delay; $T_{prop}$ is the signal propagation time across the bus; $T_{su}$ is the input setup time to CLK; and $T_{skew}$ is total clock tree skew time. For the most part, PCI, and especially PCI-X, designs are sensitive to critical path issues as manifested by $T_{val}$, because $T_{val}$ is a function of the internal paths within a PCI/PCI-X device. For example, a PCI device must meet a minimum $T_{val}$ value of 2.0 ns and a maximum value of 6 ns (PCI66) or 11 ns (PCI33). By contrast, for PCI-X devices, $T_{val}$ must meet a minimum value of 0.7 ns and a maximum value of 3.8 ns.

Although it is desirable to provide a multiprotocol computer bus interface adapter that meets both PCI and PCI-X requirements, a suitable PCI/PCI-X adapter is constrained both by the minimum PCI $T_{val}$ time(2.0 ns) and the maximum PCI-X $T_{val}$ time(3.8 ns). An additional constraint can be imposed by the technology in which the PCI-X device is realized, particularly in modern, deep-submicron CMOS processes. PCI/PCI-X devices are specified to use a nominal main power supply voltage, $V_{cc}$, of about 3.3V, yet deep-submicron devices often operate with a substantially lower $V_{cc}$. For example, a device fabricated under a 0.13 micron CMOS technology may employ a nominal $V_{cc}$ of about 1.2V; with 0.18 micron CMOS designs, the nominal $V_{cc}$ can be limited to about 1.8V. Thus, a device which gains the size, speed, and cost advantages of CMOS devices fabricated using deep submicron technology may need to employ voltage level shifting devices at the interface between the internal circuitry of the device, with a nominal $V_{cc}$ of, for example, 1.2V or 1.8V, and the external circuitry, which is exposed to the PCI/PCI-X signaling environment of 3.3V. Such voltage level shifting can add to critical path delays, which may lead to violation of the maximum PCI-X $T_{val}$ time.

In addition to predictive time base generator 130, 230, as described with regard to FIG. 1 and FIG. 2, respectively, the present invention also provides a multiprotocol computer bus interface adapter, fabricated using deep submicron CMOS processes, for example, an 0.18 micron CMOS fabrication process, which (1) satisfies the timing and voltage requirements of both the PCI and PCI-X specifications; (2) minimizes the impact on $T_{val}$ time; and (3) is robust to variations in design, fabrication processes, and environmental conditions.

Figure 3A:
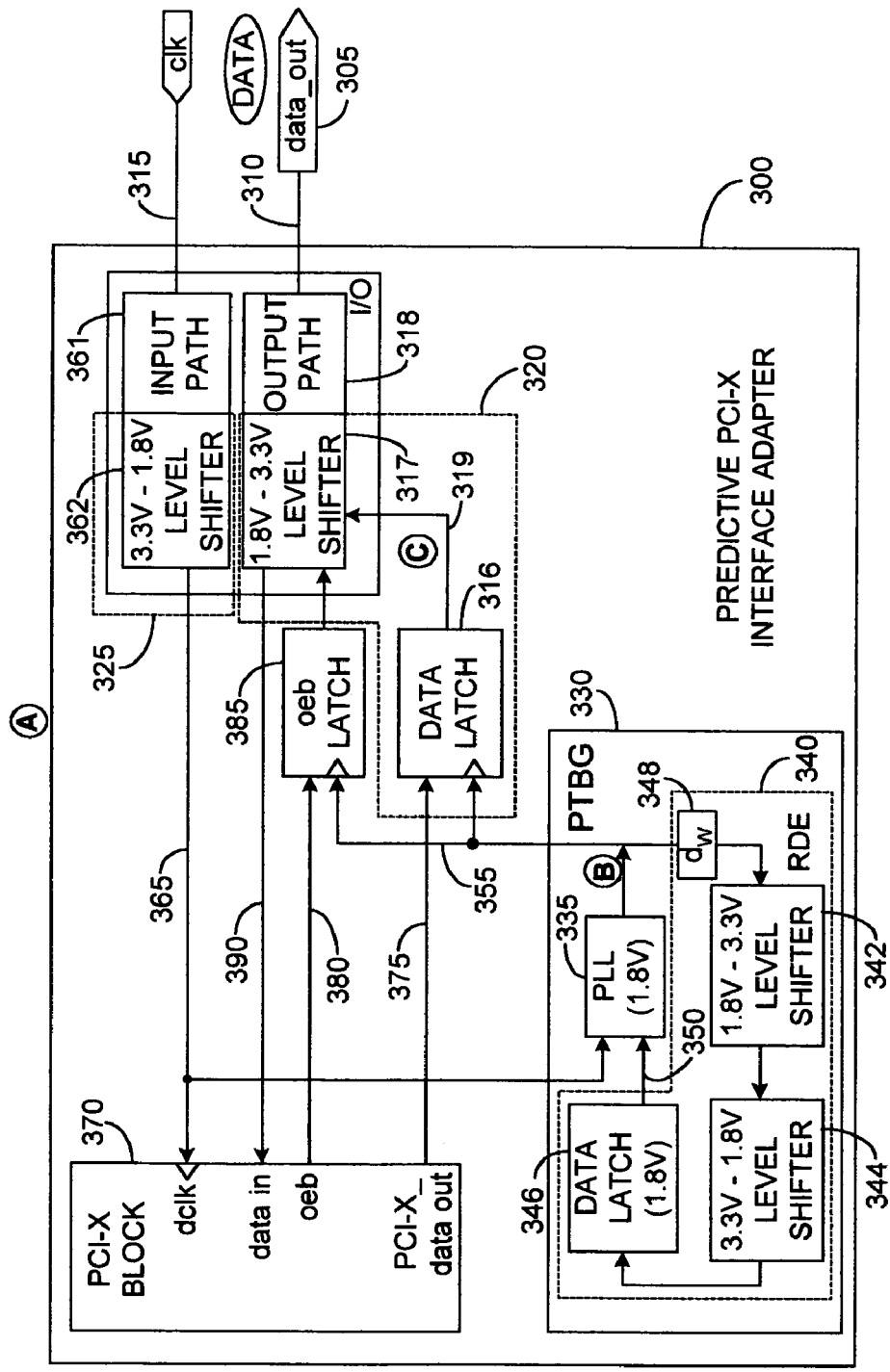
FIG. 3A is a block schematic of an embodiment of a PCI-X local bus predictive interface adapter employing a predictive time base generator, according to the present invention.

FIG. 3A illustrates an embodiment of the present invention in the form of predictive interface adapter 300, suitable for coupling with a PCI-X local bus, disposed within communication system 301, which adapter 300 includes PTBG 330, data delay element 320, and clock delay element 325. PIA 300 is disposed to bidirectionally communicate with a computer bus via PCI(X)_data_out 305, which bus employs the PCI-X protocol, the PCI protocol, or both. PCI-X block 370 can be separate from PIA 300 or, optionally, PCI-X block 370 can be included as part of PIA 300. In certain embodiments of the invention, PIA 300 can be adapted to bidirectionally communicate with communication network 371 in communication system 301, and may be coupled to network 371 by way of PCI-X block 370. Because PIA 300 is desired to be manufactured using a deep-submicron VLSI process, such as a 0.18 µm CMOS VLSI process, PIA 300 has a nominal internal operating voltage ($V_{cc}$) of about 1.8V, in contrast with the PCI-X nominal operating voltage of about 3.3 V. Thus, it is desirable to provide 3.3V-to-1.8V voltage level shifter 362 to reduce the incoming clock voltage from 3.3V to 1.8V. It likewise is desirable to up-shift the outgoing data voltage from 1.8V to 3.3V, using 1.8V-to-3.3V voltage level shifter 317. A disadvantage of employing voltage level shifters 317, 362 can be that they may account for at least a portion of the data delay and clock delay, respectively. To compensate for these delays, replica delay element 340 is provided within PTBG 330, and can include replica 1.8V-to-3.3V voltage level shifter 342, as well as replica 3.3V-to-1.8V voltage level shifter 344, in feedback delay path 350. Although the embodiment of FIG. 3A does not compensate for delays represented by input path 361 and output path 318 (e.g., arising from adapter 300 I/O pads), or delays due to internal wiring, such may be accommodated within replica delay element 340, if desired, for example, perhaps as part of wire delay element 348, along with any other wire delay for which compensation is intended. Similarly, clock tree delays in the critical signal paths, which may be a component of clock delay element 325, also could be incorporated into replica delay element 340. Output data latch 316 also is a portion of the critical delay path represented by data delay element 320 and, as such, it is desirable to include a corresponding replica delay element in the form of data latch 346 within replica delay element 340. Indeed, a skilled artisan would realize that, by incorporating into replica delay element 340 other replica delay elements corresponding to other delay components, the delays corresponding to these other delays also can be substantially reduced or nullified.

In PTBG 330, it is desired to employ a phase-locked loop (PLL) as predictive synchronizer 335, to create predictive clock signal 355, which assists synchronizing the availability of valid data on data output path 318 approximately at the moment when the preselected (preferably, rising) edge of input clock signal 315 arrives at input path 361. Alternatively, the predictive synchronizer can be realized using a delay-locked loop (DLL). Both PLLs and DLLs are well-known in the digital arts. PLL 335 generates a clock signal 355, responsive to delayed clock signal 365. As before, replica delay components 342, 344, 346, 348, constituting replica delay element 340, are interposed in feedback delay 350 of PLL 335 such that predictive clock signal 355 is produced in a manner that substantially nullifies the predetermined clock delay produced by clock delay element 325, and the predetermined data delay produced by data delay element 320. In PIA 300, interface block 370, as represented by a PCI-X interface block, makes data available on output path 375 in advance of input clock signal 315 arrival. The constituent components of PCI-X interface block 370 are well-known and, for the sake of clarity, will not be described further; the present invention contemplates embodiments both including and excluding PCI-X block 370.

PIA 300 can be a PCI/PCI-X target device, substantially conforming to the PCI-X local bus requirements and, thus, can have nearly two full clock cycles to respond to a requester's valid request. Therefore, the required data is usually available for transfer in advance of input clock signal 315. However, without PTBG 330, input clock signal 315 otherwise would be delayed by an amount equivalent to the delay induced by clock delay element 325 (i.e., level shifter 362 and any other clock-related delay presented) to produce delayed clock signal 365. Delayed clock signal 365 would then clock data latch 316 after the predetermined clock delay, and the data would then be valid at output path 318 after the critical path delay associated with data delay element 320. Thus, relative to the timing budget constraints of PCI/PCI-X protocols, $$T_{val} \geq T_{input\ path} + T_{clock\ delay} + T_{data\ delay} + T_{output\ path},$$

and the use of delayed clock signal 365 may produce a value for $T_{val}$ which exceeds, or comes unacceptably close to, maximum values for the clock-to-output-signal-valid delay, i.e., $T_{val}$, as defined in the relevant specification.

PTBG 330 produces clock signal 355 in a manner which predicts the arrival of the preselected (e.g., rising) edge of input clock signal 315, so that data from PCI-X block 370, is clocked through data latch 316, up-shifted in voltage by voltage level shifter 317, and available on PCI(X)_data_out 305, approximately at the moment the edge of input clock signal 315 rises to a preselected value, for example, to $V_{ih}$ (defined in the relevant PCI-X specification to be nominally about 0.5 $V_{cc}$). It also is desirable to clock oeb latch 385 concurrently with data latch 316, using predictive clock 355, so that operation of the two latches is substantially simultaneous. Because the use of replica delay element 340 in PTBG 330 substantially nullifies the predetermined clock delay and the predetermined data delay, such that the clock-to-output-signal-valid delay is approximately:

$$T_{val} \geq T_{input\ path} + T_{output\ path},$$

thereby substantially minimizing critical path delays induced by delay elements within PIA 300.

Figure 3B:
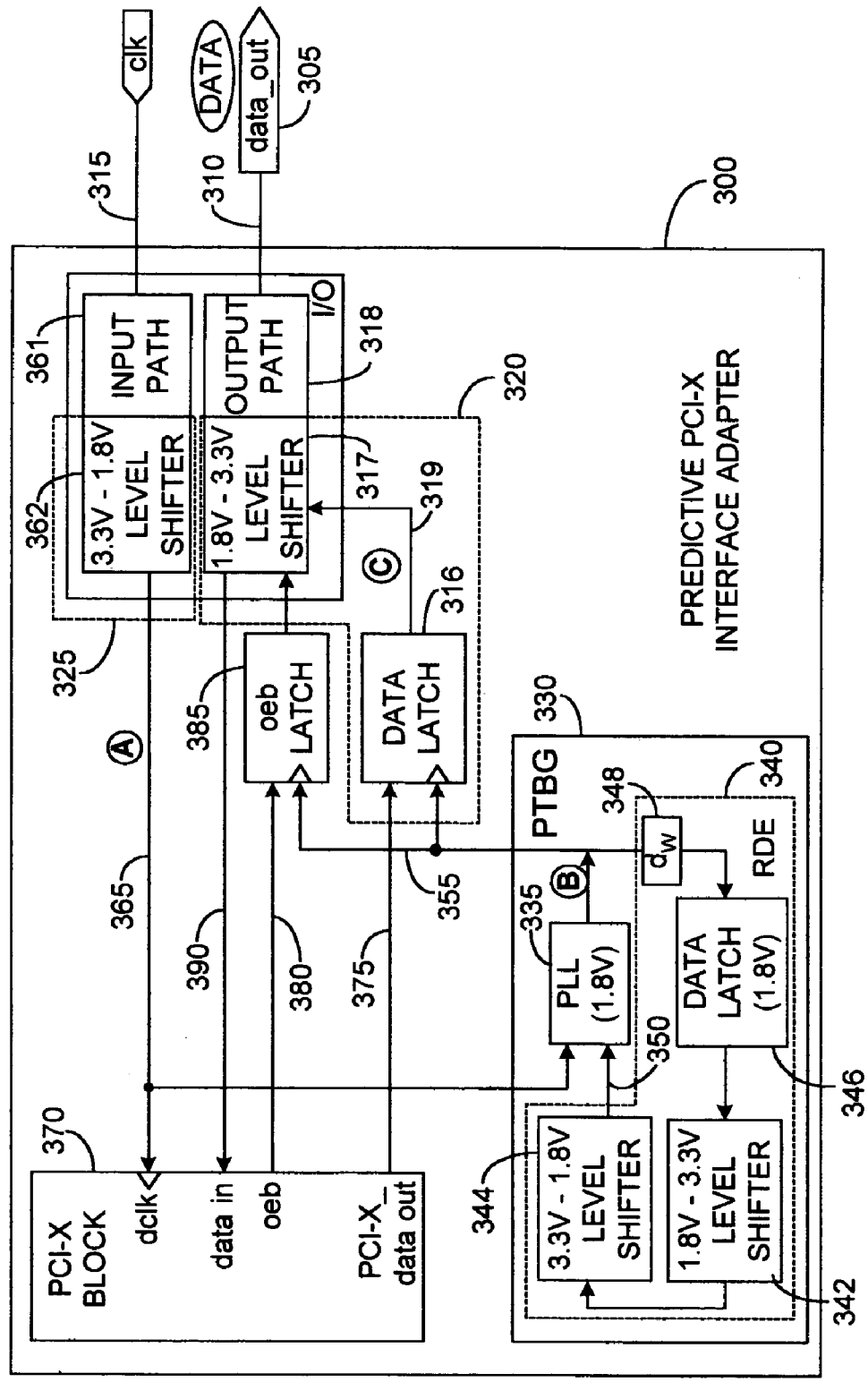
FIG. 3B is a block schematic of another embodiment of a PCI-X local bus predictive interface adapter employing a predictive time base generator, according to the present invention.

FIG. 3B illustrates an alternative embodiment of PIA 300, within communication system 301, such that the placement of voltage level shifters 342, 344 and data latch 346 are transposed in feedback delay path 350, in contrast to the placement of these replica delay elements in FIG. 3A. This alternative placement is illustrative of the notion that components within PTBG 330 may be arranged to provide a more efficient and compact VLSI footprint, if desirable.

Figure 4:
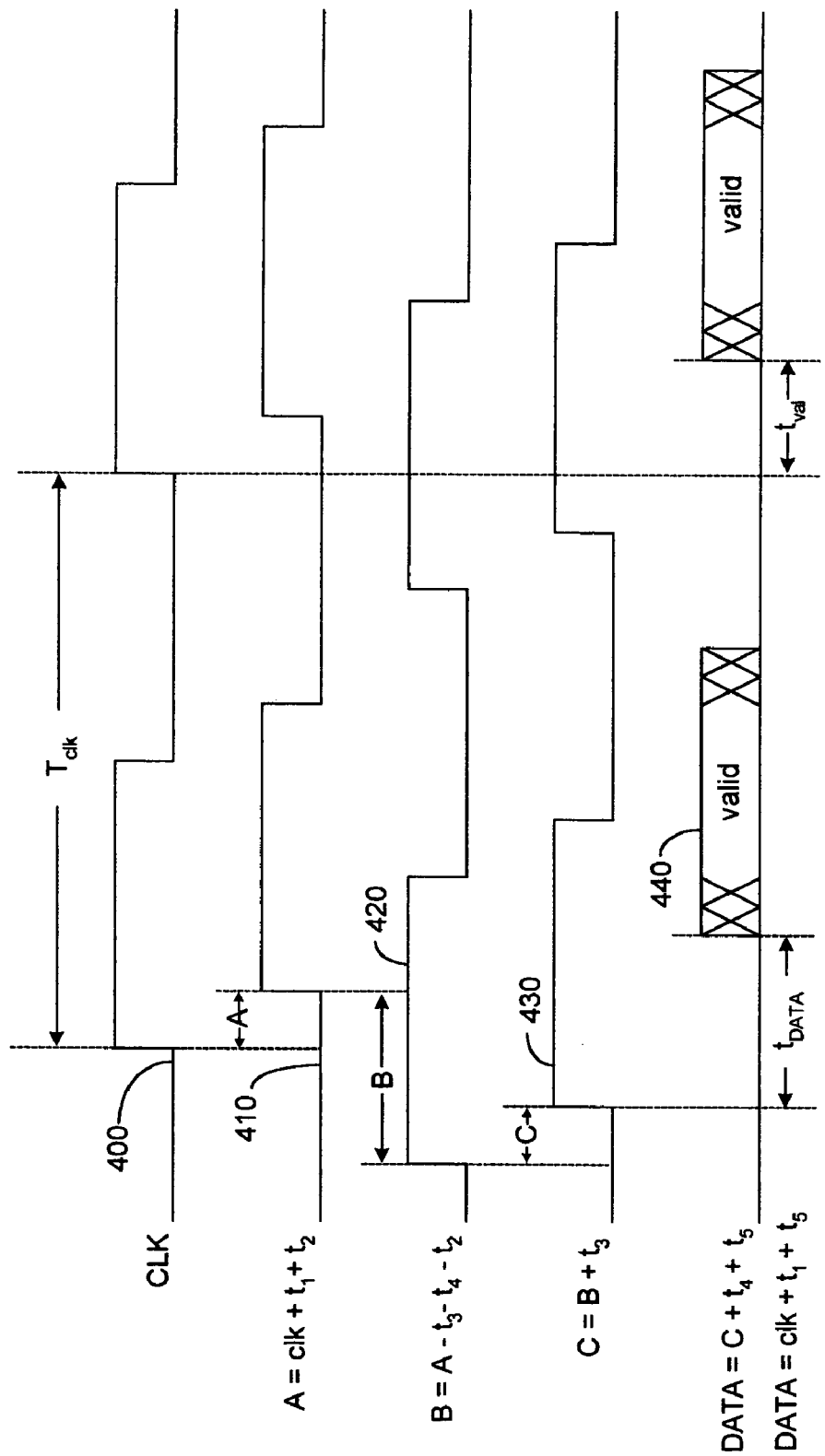
FIG. 4 is a simplified timing diagram illustrating timing characteristics of the predictive interface adapter in FIG. 3.

FIG. 4 illustrates the aforementioned timing principles in the context of FIG. 3A and FIG. 3B. In FIG. 4, CLK signal 400, is representative of input clock signal 315; signal A 410 is representative of delayed clock signal 365; signal B 420 is representative of predictive clock signal 355; signal C 430 is representative of output signal 319 traversing the output data delay element 320, at a point approximately between output data latch 316 and 1.8V-to-3.3V voltage level shifter 317; and signal DATA 440 is representative of the data signal available on data output 305, at a given time point. Also, time delays $t_1$ and $t_2$ are representative of the predetermined clock delay due to input path 361 and 3.3V-to-1.8V voltage level shifter 362, respectively. Thus, $t_{input\ delay} = t_1 + t_2$. Furthermore, time delays $t_3$, $t_4$, and $t_5$ are representative of the predetermined data delay due to output data latch 316 (and oeb latch 385); the delay due to 1.8V-to-3.3V voltage level shifter 317; and the delay due to output path 318, respectively. Thus, $t_{output\ delay} = t_3 + t_4 + t_5$. In order to properly advance predictive clock 355 (Signal B 420), this example includes replica delay elements in the feedback delay loop 350 of PTBG 330, such that Signal B 420=CLK signal 400−($t_2+t_3+t_4$). As before, the examples in FIGS. 3A, 3B, and 4 opt not to compensate for delays $t_1$ and $t_5$.

When CLK 400 arrives, signal A 410 is seen to be delayed by an amount equivalent to $t_1+t_2$. Signal B 420 then corresponds to predictive clock signal 355 arriving at data latch 316 (and oeb latch 385), advanced by an amount of time approximately equivalent to $t_2+t_3+t_4$. It is assumed that PCI-X block 370 has valid data on data path 375 by the arrival of the rising edge of signal 355. When clock signal 355 (i.e., signal B 420) clocks output data latch 316, output data on data path 375 propagates through latch 316 and arrives at path 319 approximately at the time signal C 430 rises. Thus, signal C 430 corresponds to signal B 420, as delayed by latch delay $t_3$. Despite the latch delay, signal C 430 nevertheless is advanced in time, relative to CLK 400, by an amount approximately equivalent to the delay $t_4$, arising from 1.8V-to-3.3V voltage level shifter 317. Once the data signal propagates through shifter 317, it becomes available as a valid DATA signal 400 (PCI(X)_data_out 305), after a delay approximately equivalent to the input path delay, $t_1$, plus the output path delay, $t_5$, or $T_{DATA}$=CLK+$t_1$+$t_5$. Therefore, the apparatus and method of the present invention substantially nullify the predetermined clock delay, as represented by $t_2$, and the predetermined data delay, as represented by $t_3$+$t_4$. If desired, the delays arising from the input path, $t_1$, and the output path, $t_5$, also could be included into the replica delay, such that $T_{DATA}$=CLK, i.e., the delays due to the PIA 300 are essentially transparent to the PCI-X bus.

Figure 5:
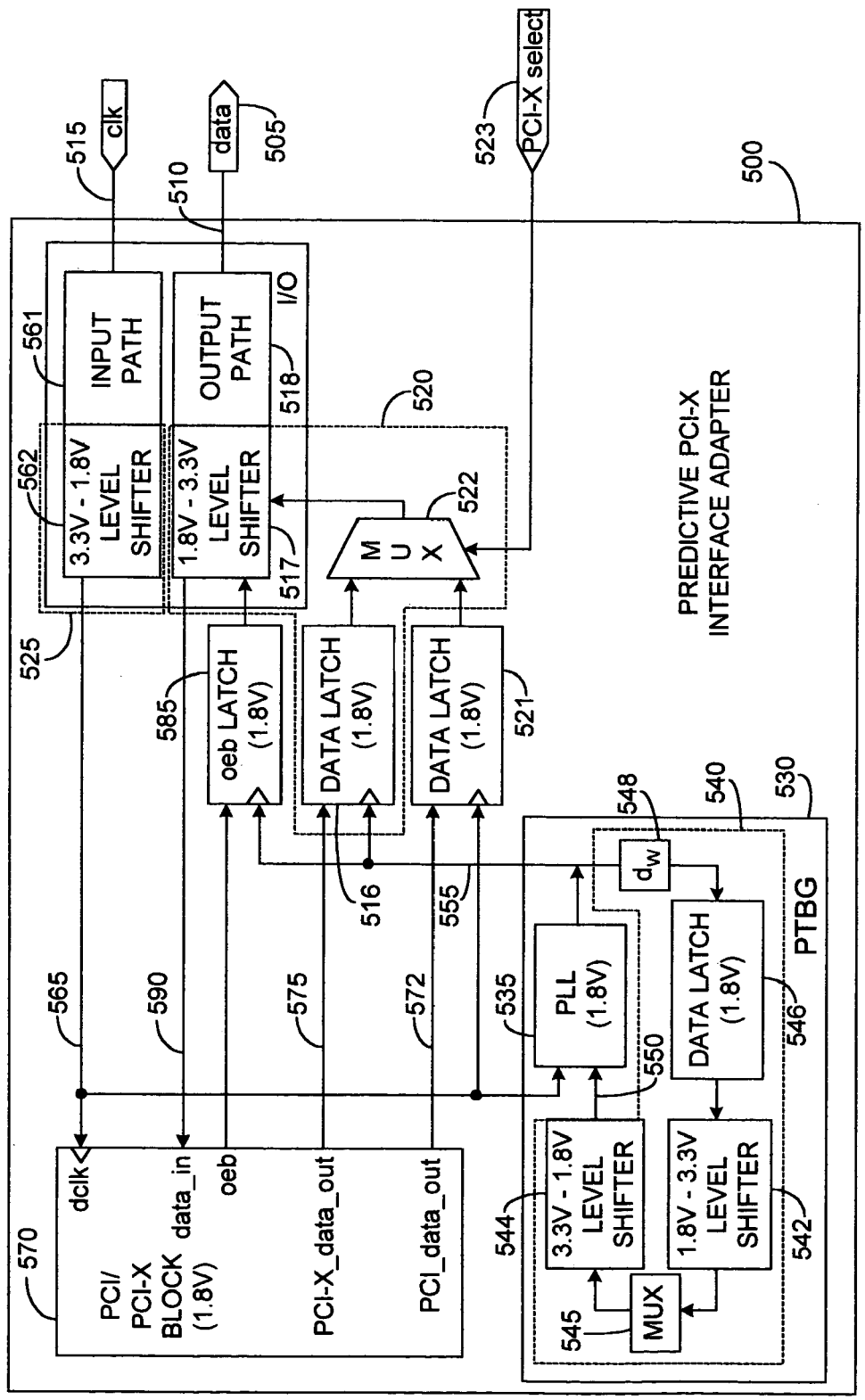
FIG. 5 is a block schematic of a embodiment of a multiprotocol PCI/PCI-X local bus predictive interface adapter employing a predictive time base generator, according to the present invention.

FIG. 5 illustrates yet another embodiment of the present invention in the form of predictive interface adapter 500. PIA 500 is adapted to provide output data under both PCI and PCI-X protocols, thus PIA 500 is a multiprotocol computer bus interface adapter (MCBIA). MCBIA 500 is disposed to bidirectionally communicate with a computer bus via PCI(X)_data_out 505, which bus employs the PCI-X protocol, the PCI protocol, or both. PCI-X block 570 can be separate from MCBIA 500 or, optionally, PCI-X block 570 can be included as part of MCBIA 500. In certain embodiments of the invention, MCBIA 500 can be adapted to bidirectionally communicate with communication network 571 in communication system 501, and may be coupled to network 571 by way of PCI-X block 570. In general, operation of MCBIA 500 can be similar to that of PIA 300 in FIG. 3, with the addition of data latch 521, for buffering data under the PCI protocol (in which time-delay compensation may not be employed); and of multiplexer 522, for selecting whether signal PCI-data-out 572, or signal PCI-X_data_out 575, is transferred to PCI(X)_data_out 505, responsive to PC$_1$-X_select signal 523. Because multiplexer 522 is added to data delay element 520 for the transfer of PC$_1$-X_data_out 575, it is desirable to add a replica multiplexer 545 to replica delay element 540. Furthermore, MCBIA 500 is similar to PIA 100 in FIG. 1 and PIA 200 in FIG. 2, in that a predictive time base generator is included in each of the aforementioned adapters.

Under the conventional PCI protocol, it may not be desirable to use predictive clock signal 555 from PTBG 530 but, instead use delayed clock signal 565. Indeed, for PCI33-compatible operation, the use of a PLL is generally discouraged because, under the conventional PCI33 protocol, (1) clock speeds are allowed to change on-the-fly, and (2) frequencies are allowed to drop down to 0 (zero) MHz, with either operation being generally incompatible with PLL operation. Also, it may be unnecessary to employ PTBG 530 for 66 MHZ signals. After arrival, signal CLK 515 traverses input path 561 as well as 3.3V-to-1.8V voltage level shifter 562 becoming delayed clock signal 565. Signal 565 triggers PCI/PCI-X block 570 to provide data under the PCI protocol using PCI_data_out data path 572. Delayed clock signal 565 clocks the PCI data through data latch 521 whose output 572, due to the de-assertion of PCI-X_select signal 523, is selected by MUX 522 for transfer to PCI(X)_data_out 505, via level shifter 517 and data path 518, due to PCI-X_select signal 523 being unasserted.

Under the PCI-X protocol, particularly during PCI-X133 operations, PCI-X_select signal 523 is asserted such that predictive clock signal 555 clocks PCI-X_data_out 575 into data latch 516 in advance of CLK 515. In this case, the output of latch 516 is selected by MUX 522 for transfer as valid output data to PCI(X)_data_out 505, after traversing voltage level shifter 518 and output path 518, being available approximately at the time when CLK signal 515 arrives as a rising edge signal. The ability to select between standard PCI and advanced PCI-X, thereby selectively employing PTBG 530 to provide a predictive clock signal, advantageously positions MCBIA 500 as a multiprotocol computer bus interface adapter, capable of operating under the PCI-X protocol up to 133 MHZ or, under the PCI protocol, down to zero MHZ, thus allowing computer bus interface adapters according to the present invention to be fully compatible with a vast array of devices, bridges, and boards already designed under long-standing PCI protocol, as well as those yet to be designed under the PCI-X enhancement.

In addition, it may be desirable to provide, for example, a PCI-X Bridge block in place of PCI-X block 570, such that communication network 571 is configured to be a second PCI/PCI-X bus. In such a case, it might be desirable to implement a second PTBG 530 (not shown) in communication with the appropriate I/O and clock signals on bus 573, with second PTBG 530 (not shown) having suitable replica delays therein, so that clock and data delays on signals from bus 573 are substantially nullified thereby. Moreover, a skilled artisan would realize that MCBIA 500, including PTBG 530, also can be adapted for use in other bus protocol applications where it is desired to compensate for delays which may be introduced by circuitry used to dispose an adapter, similar to MCBIA 500, for operations under multiple bus protocol timing, voltage, and operational requirements.

Figure 6:
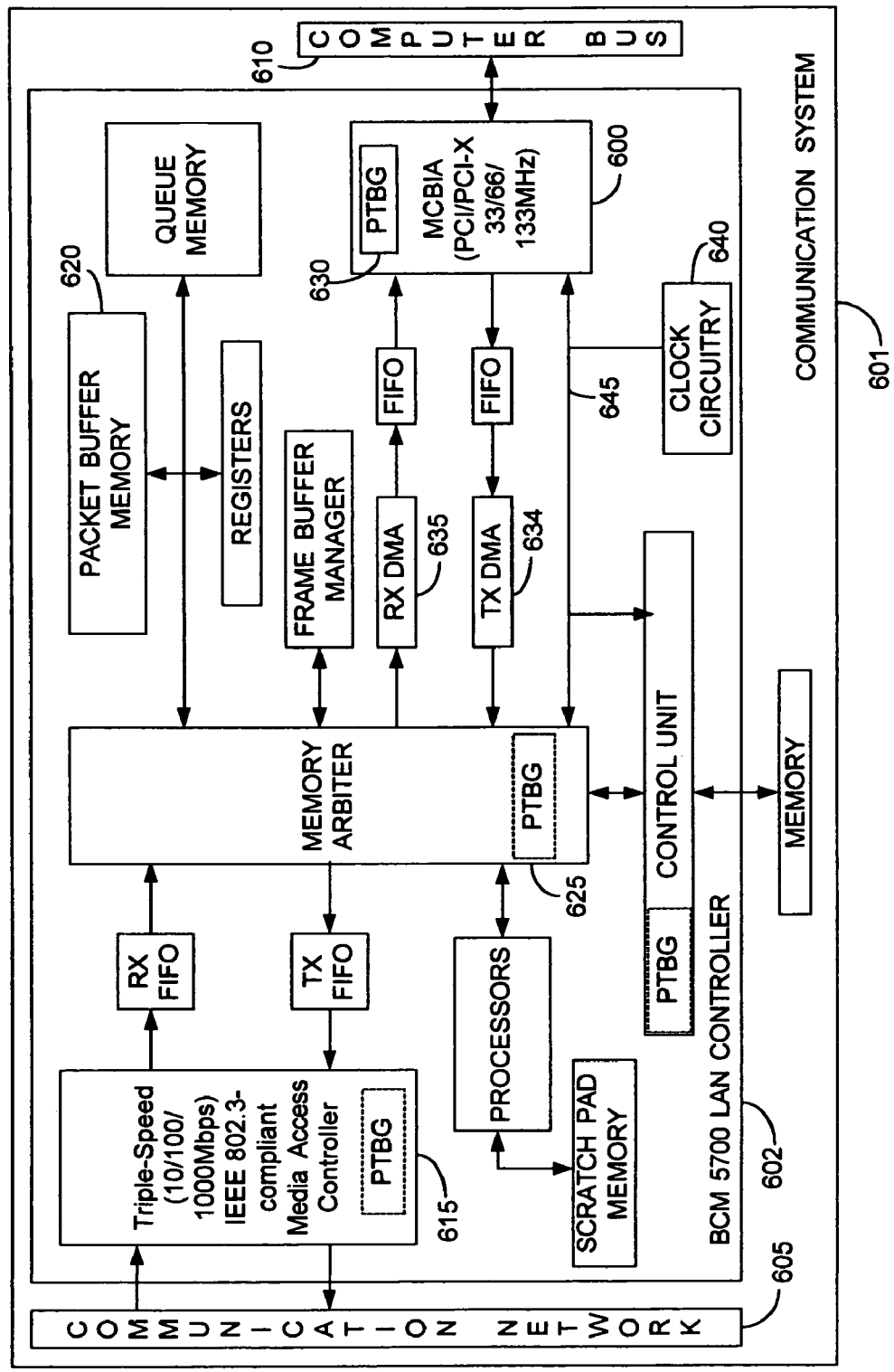
FIG. 6 is a simplified block schematic of a local area network controller, according to the present invention.

FIG. 6 is an illustration of the multiprotocol computer bus interface adapter 600 (MCBIA), as implemented within a highly-integrated 10/100/1000BASE-T Ethernet LAN controller 602, such as the BCM 5700 PCI-X 10/100/1000BASE-T CONTROLLER, produced by Broadcom Corporation, Irvine, Calif. MCBIA 600 is similar to predictive PCI-X Interface Adapter 300 in FIGS. 3A and 3B, and to MCBIA 500 in FIG. 5. Controller 602 within communication system 601 (shown in simplified form for clarity) is optimized for NIC and LOM applications, and combines a 10/100/1000BASE-T IEEE 802.3-compliant Media Access Controller (MAC) 615, multiprotocol computer bus interface adapter 600, and on-chip packet buffer memory 620 in a single device. Within the context of LAN controller 602, MCBIA 600 can facilitate communication between network 605 and PCI/PCI-X computer bus 610. An exemplary data signal from computer bus 610 can be received by MCBIA 600 and transferred to TX DMA 634, which data signal is communicated through memory arbiter 625 to transmit circuitry within MAC 615 and, then, to network 605. Similarly, an exemplary data signal from network 605 can be received by receive circuitry in MAC 615, which data signal is communicated through memory arbiter 625 to RX DMA 635 and, then, to computer bus 610 via MCBIA 600. In addition, MCBIA 600 can accommodate bidirectional PCI/PCI-X data transfers localized to computer bus 610, as illustrated with regard to the PCI/PCI-X operations in FIGS. 3A, 3B, and 5. In general, MCBIA 600 is adapted to compensate for clock delays introduced to clock signal 645, as received from clock circuitry 640, and data delays introduced into data communicated with computer bus 610, and includes PTBG 630, similar to PTBG 130, 230, 330, 530, in FIGS. 1, 2, 3A & 3B, and 5, respectively. MCBIA 610 also may include replica delay circuitry that substantially nullifies other delays such as, for example, selected delays introduced by MAC 615, arbiter 625, TX/RX DMA 634, 635, respectively, and the like, however, such is not required to practice the present invention. It also may be desirable to employ a predictive time base generator, such as PTBG 630, or other PTBG according to the present invention, within MAC 615, arbiter 625, or other preselected locations within LAN controller 602.

Many alterations and modifications may be made by those having ordinary skill in the art without departing from the spirit and scope of the invention. Therefore, it must be understood that the illustrated embodiments have been set forth only for the purposes of example, and that it should not be taken as limiting the invention as defined by the following claims. The following claims are, therefore, to be read to include not only the combination of elements which are literally set forth but all equivalent elements for performing substantially the same function in substantially the same way to obtain substantially the same result. The claims are thus to be understood to include what is specifically illustrated and described above, what is conceptually equivalent, and also what incorporates the essential idea of the invention.

What is claimed is:

1. A communication system for reducing an interface delay relative to a present phase of an external clock signal from an interface delay element, the system comprising:
    means for providing the external clock signal to a predictive synchronizer having a feedback path and an output path, the output path being coupled with the interface delay element;
    means for providing a feedback signal into the predictive synchronizer from the feedback path; and
    means for interposing a replica delay element corresponding to the interface delay element into the feedback path, the replica delay element introducing a replica delay corresponding to the interface delay into the feedback path,
    wherein an output signal of the output path is advanced in time and in response to the replica delay so that the interface delay is reduced, wherein the output signal leads the present phase of the external clock.

2. The system of claim 1, wherein the interface delay element comprises one of a clock delay element, a data delay element, and a combination thereof, and the respective replica delay comprises one of a clock delay, a data delay, and a combination thereof.

3. The system of claim 1, further comprising a computer bus for utilizing the reduced interface delay.

4. The system of claim 3, wherein the computer bus is adapted to communicate using one of a PCI protocol, a PCI-X protocol, and a combination thereof.

5. The system of claim 1, further comprising a communication network for utilizing the reduced interface delay.

6. The system of claim 5, wherein the communication network is an IEEE 802.3-compliant communication network.

7. The system of claim 6, wherein the IEEE 802.3-compliant communication network comprises a 1000BASE-T IEEE 802.3-compliant communication network.

8. The system of claim 1, wherein the predictive synchronizer comprises one of a phase-locked loop and a delay-locked loop.

9. A predictive time base generator for reducing a path delay relative to a present phase of an external clock signal of a delay element, the predictive time base generator comprising:
    a predictive synchronizer coupled to receive the external clock signal, the predictive synchronizer having a feedback path and an output path, the output path being coupled with the delay element,
    wherein the feedback path provides a feedback signal into the predictive synchronizer; and
    a replica delay element interposed into the feedback path, the replica delay element introducing a replica delay corresponding to the path delay into the feedback path,
    wherein an output signal of the output path is provided in response to the replica delay to reduce the path delay of the delay element, wherein the output signal leads the present phase of the external clock.

10. The predictive time base generator of claim 9, wherein the replica delay element comprises a replica clock delay element providing a clock delay and/or a replica data delay element providing a data delay.

11. The predictive time base generator of claim 10, further comprising a second replica delay element interposed into the feedback path, the second replica delay element introducing a replica wire delay corresponding to one or more wire delays into the feedback path.

12. The predictive time base generator of claim 9, wherein the replica delay element comprises a replica voltage level shifter and/or a replica data latch.

13. The predictive time base generator of claim 9, wherein the replica delay element comprises a replica voltage level shifter, a replica buffer, and a wire delay representative all coupled in series to the predictive synchronizer.

14. The predictive time base generator of claim 13, wherein the replica voltage level shifter is coupled between the replica buffer and the wire delay representative.

15. The predictive time base generator of claim 13, wherein the replica buffer is coupled between the replica voltage level shifter and the wire delay representative for providing a more efficient and compact footprint for the predictive time base generator.

16. The predictive time base generator of claim 9, wherein the predictive synchronizer comprises a phase lock loop (PLL).

17. The predictive time base generator of claim 9, wherein the predictive synchronizer comprises a delay lock loop (DLL).

18. A predictive time base generator for reducing an interface delay relative to a present phase of an external clock signal of an interface delay element, the predictive time base generator comprising:
    first means for receiving the external clock signal and providing a feedback path and an output path, the output path being coupled with the interface delay element;
    second means for providing a feedback signal into the first means from the feedback path; and
    third means for replicating the interface delay element into the feedback path, the third means introducing a replica delay corresponding to the interface delay into the feedback path,
    wherein an output signal of the output path is provided in response to the replica delay to reduce the interface delay, wherein the output signal leads the present phase of the external clock.

19. The predictive time base generator of claim 18, wherein the third means comprises a replica clock delay element and/or a replica data delay element.

20. The predictive time base generator of claim 19, wherein the first means comprises at least a portion of a phase lock loop (PLL) and/or a delay lock loop (DLL).

21. A communication system for reducing an interface delay from an interface delay element, the system comprising:
- means for providing an external clock signal to a predictive synchronizer having a feedback path and an output path, the output path being coupled with the interface delay element;
- means for providing a feedback signal into the predictive synchronizer from the feedback path;
- means for interposing a replica delay element corresponding to the interface delay element into the feedback path, the replica delay element introducing a replica delay corresponding to the interface delay into the feedback path, wherein an output signal of the output path is advanced in time and in response to the replica delay so that the interface delay is reduced; and
- a computer bus for utilizing the reduced interface delay, wherein the computer bus is adapted to communication using one of a PCI protocol, a PCI-X protocol, and a combination thereof.

22. A communication system for reducing an interface delay from an interface delay element, the system comprising:
- means for providing an external clock signal to a predictive synchronizer having a feedback path and an output path, the output path being coupled with the interface delay element;
- means for providing a feedback signal into the predictive synchronizer from the feedback path; and
- means for interposing a replica delay element corresponding to the interface delay element into the feedback path, the replica delay element introducing a replica delay corresponding to the interface delay into the feedback path, wherein an output signal of the output path is advanced in time and in response to the replica delay so that the interface delay is reduced; and
- a communication network for utilizing the reduced interface delay,
- wherein the communications network is an IEEE 802.3 compliant communication network.

* * * * *

UNITED STATES PATENT AND TRADEMARK OFFICE
CERTIFICATE OF CORRECTION

PATENT NO.        : 7,366,940 B2                                      Page 1 of 1
APPLICATION NO.   : 10/990657
DATED             : April 29, 2008
INVENTOR(S)       : Chiao et al.

It is certified that error appears in the above-identified patent and that said Letters Patent is hereby corrected as shown below:

Cover Page
(*), Notice section, please add "This patent is subject to a terminal disclaimer," language.

Signed and Sealed this

Thirty-first Day of March, 2009

JOHN DOLL
*Acting Director of the United States Patent and Trademark Office*